Nov. 16, 1926.
A. B. J. SMITH
1,607,571
INTERNAL COMBUSTION ENGINE
Filed June 15. 1925
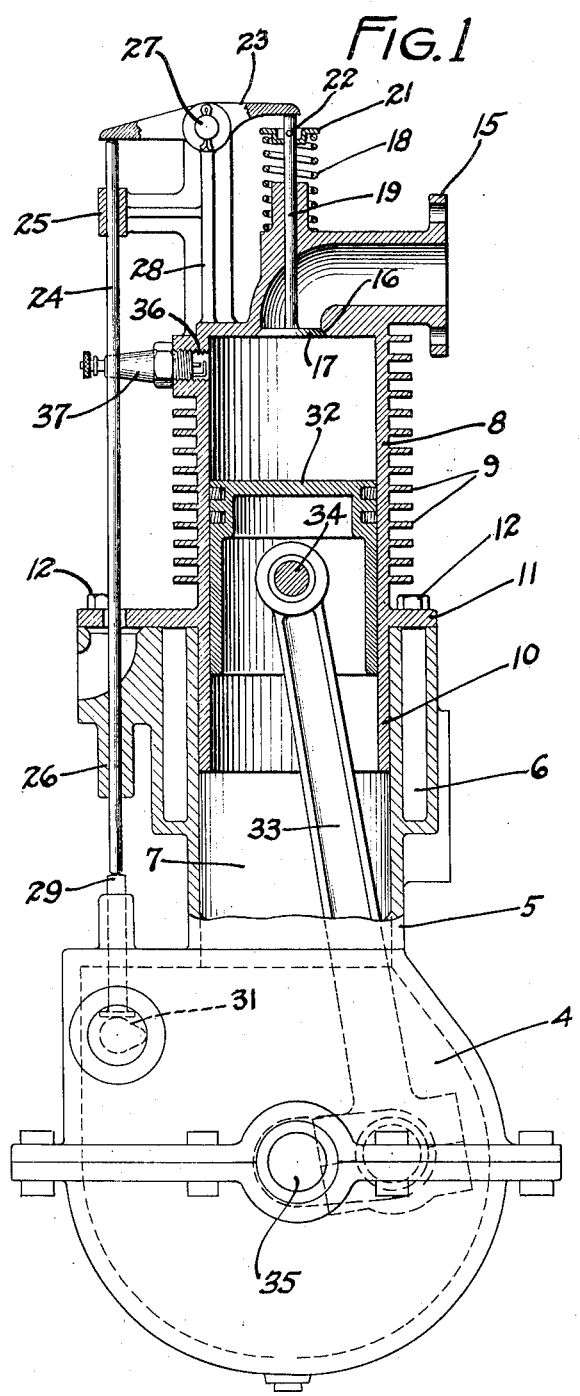
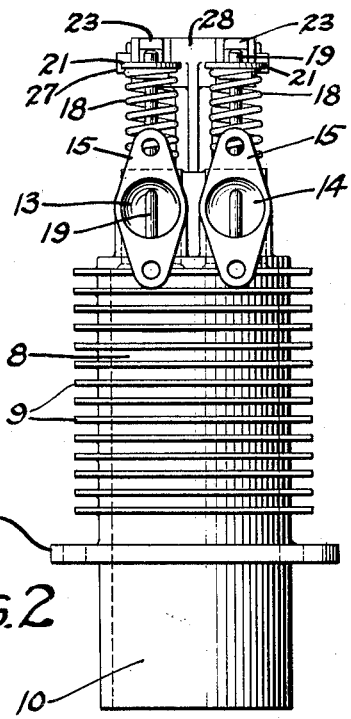
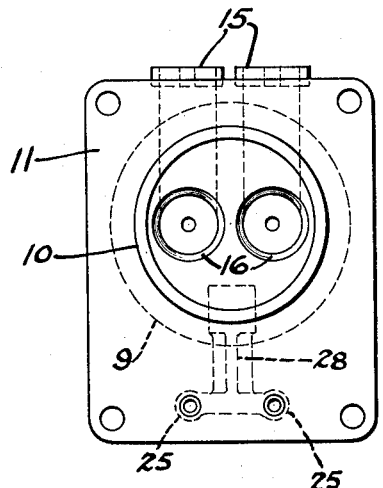
Inventor
ALBERT B. J. SMITH
ATTORNEYS Patented Nov. 16, 1926.

1,607,571

UNITED STATES PATENT OFFICE.

ALBERT B. J. SMITH, OF MINNEAPOLIS, MINNESOTA.

INTERNAL-COMBUSTION ENGINE.

Application filed June 15, 1925. Serial No. 37,169.

This invention relates to new and useful improvements in internal combustion engines, and more particularly relates to an improved means for converting such an engine of the water cooled type into an air cooled engine.

An object of the invention is to provide a complementary air cooled cylinder adapted to be mounted upon the usual water cooled cylinder of an internal combustion engine, thereby dispensing with the use of water or other liquids for cooling the engine with the resultant convertibility of such an engine into an air cooled engine.

A further and more specific object of the invention is to provide a complementary air cooled cylinder adapted to have the valve mechanism mounted thereon, and such cylinder also having a cylindrical extension adapted to be seated within the bore of a water cooled cylinder to retain it in true axial alinement therewith.

A further object is to provide a demountable air cooled cylinder of simple and inexpensive construction which may readily and conveniently be mounted upon the cylinder of an ordinary water cooled engine, thereby converting such an engine into an air cooled engine.

A further object is to provide means operable in conjunction with an internal combustion engine to reduce to a minimum the usual side strains exerted against the cylinder walls by the action of the piston, caused by the inclination of the connecting rod, as the piston is being depressed during the power stroke.

The particular object of the invention, therefore, is to provide a simple means for converting an ordinary water cooled engine into an air cooled engine.

Other objects of the invention will appear from the following description and the accompanying drawings and will be pointed out in the annexed claims.

In the accompanying drawing, there has been disclosed a structure designed to carry out the various objects of the invention, but it is to be understood that the invention is not confined to the exact features shown as various changes may be made within the scope of the claims which follow.

In the accompanying drawings forming part of this specification,

Figure 1 is a view, partially in section, of an ordinary internal combustion engine of the water cooled type, showing the invention applied thereto;

Figure 2 is a view showing the demountable air cooled cylinder removed from the engine; and Figure 3 is a bottom view of the cylinder.

In the selected embodiment of the invention here shown, for purposes of disclosure, there is illustrated an ordinary internal combustion engine of the water cooled type, comprising the usual crank case 4 having the cylinder block 5 mounted thereon in the usual manner. The usual water jacket 6 is also shown encircling the cylinder 7 as is customary in engines of this type.

An important feature of this invention resides in the novel means provided for converting an internal combustion engine of the water cooled type into an air cooled engine, thereby dispensing with the use of water for cooling the engine while the latter is in operation. The means provided for thus converting a water cooled engine into an air cooled engine consists of a complementary air cooled cylinder 8, having the usual heat-radiating fins or webs 9 provided thereon, which is adapted to be demountably secured to the engine block 5 preferably in axial alinement with the usual cylinder 7. This cylinder, as shown in Figures 1 and 2 is preferably provided with a cylindrical extension 10 adapted to be received in the upper portion of the cylinder bore 7. A flange 11 is also preferably integrally formed on the wall of the cylinder 8 adapted to be seated upon the upper face of the cylinder block 5 and is secured thereto by such means as the bolts or cap screws 12.

When converting a water cooled engine into an air cooled engine, the usual cylinder head (not shown) must necessarily be removed from the cylinder block, and the valves are therefore preferably mounted upon the upper portion of the cylinder 8 as particularly shown in Figure 1. The complementary cylinder 8 is therefore preferably provided at its upper portion with the usual intake and exhaust ports 13 and 14, respectively, which are provided with suitable apertured flanges 15 to which the usual intake and exhaust manifolds may be secured in the usual manner. Each intake and exhaust port is provided with a valve seat 16 against which a valve 17 is adapted to be yieldably seated by the action of a coiled compression spring 18, mounted to encircle the upper portion of the valve stem 19, and which spring is seated against a washer 21 mounted upon the valve stem and prevented from longitudinal movement thereon by means of a pin 22. Each valve is provided with a complementary rocker arm 23 having one end adapted to engage the upper end portion of the valve stem and having its opposite end adapted to be engaged by a push rod 24, slidably mounted in guides 25 and 26 as shown in Figure 1. The rocker arms 23 are preferably mounted upon a pin or rod 27 carried by a post or bracket 28 which may be either integrally formed on the cylinder as shown, or, if desired, it may be demountably secured thereto.

Referring to Figure 1, it will be noted that the lower end of the push rod 24 is preferably mounted in the usual valve stem guide of the cylinder block 5, and from which guide the usual valves are removed when the engine is converted into an air cooled engine. The push rods are adapted to be operated in timed relation with the piston by the usual tappets 29, actuated by the cam shaft 31.

A piston 32, of ordinary construction, is reciprocally mounted within the bore of the demountable cylinder 8 and is connected to the connecting rod 33 by means of the usual wrist pin 34. The lower end of the connecting rod is connected to the crank shaft 35 in the usual manner.

When converting a water cooled engine into an air cooled engine, as above described, the usual cylinder head, (if the engine is of the demountable head type) is removed from the cylinder block after which the valves and their associated parts, and also the pistons and connecting rods are removed. The air cooled cylinder 8 is then mounted upon the cylinder block with the extension 10 inserted into the cylinder bore 7 and the flange 11 being seated against the upper face of the cylinder block. As a result of the extension 10 being of considerable length, the alining of the cylinder 8 with the cylinder 7 will not be dependent upon the engagement of the flange 11 with the upper face of the cylinder block, such alining of the two cylinders being accomplished entirely by the fitting of the extension 10 within the bore of the cylinder 7. By thus alining the two cylinders, the axis of the wrist pin 34 will also be parallel to the axis of the crank shaft, thereby eliminating any possibility of unnecessary strains being exerted against the connecting rod bearings as a result of inaccurate alinement of the two cylinders. It will also be noted that by mounting the cylinder 8, as above described, with the compression chamber or upper end of the cylinder a considerable distance from the face of the cylinder block, the connecting rod 33 must necessarily be increased in length. This has been found of considerable advantage in internal combustion engines as a result of the reduced operating angle of the connecting rod with respect to the vertical axis of the cylinder, thereby resulting in minimizing the side strains exerted against the wall of the cylinder when the piston is being depressed during the power stroke and also when it is being upwardly moved during the compression stroke.

After the cylinder 8 has been mounted upon the cylinder block and the piston and connecting rod connected to the crank shaft as shown in Figure 1, the push rods 24 may be mounted in the guides 25 and 26 and the intake and exhaust manifolds (not shown) connected to the flanges 15 in the usual manner. A threaded socket 36 may also be provided in the upper portion of the cylinder 8 to receive the usual spark plug 37.

From the foregoing, therefore, it will readily be seen that by the employment of the novel demountable air cooled cylinder and associated parts featured in this invention, that an ordinary water cooled engine may readily be converted into an air cooled engine, thereby dispensing with the use of a cooling liquid for cooling the engine, the use of which has been found objectionable especially in cold weather as a result of freezing and evaporation. Also by mounting the cylinder 8 in such a manner that the compression chamber will be a considerable distance from the cylinder block 5, the cylinder 8 may be provided with ample radiating fins or webs so that there will be no difficulty in maintaining the engine at the most efficient operating temperature.

In the accompanying drawing and the above description I have referred to the invention as being applied to an internal combustion engine having a demountable cylinder head. It is to be understood, however, that it may be employed equally as well in conjunction with various other types of internal combustion engines, and also that various changes and modifications may be made in the details of construction without departing from the invention. For instance, the complementary cylinder 8 may be mounted upon the cylinder block 5 in such a manner as to be out of axial alinement with the cylinder bore 7, or, it may be mounted at a slight incline with respect thereto. The cylinder 8 may also be provided with a demountable head instead of having the intake and exhaust ports integrally formed in the upper portion of the cylinder as shown.

Having thus described my invention, what I claim as new and desire to secure by Letters Patent is,

1. The combination with a cylinder of a water cooled internal combustion engine, of a complementary cylinder adapted for air cooling, connected and alined with said first mentioned cylinder, and having valve-controlled exhaust and intake ports, rocker-arm bearings, and push-rod guides.

2. The combination with a cylinder of a water cooled internal combustion engine, of a complementary cylinder adapted for air cooling demountably mounted upon said first mentioned cylinder whereby said water cooled engine is converted into an air cooled engine.

3. The combination with a cylinder of a water cooled engine, of a complementary cylinder adapted for air cooling mounted to telescope and be alined with said first mentioned cylinder to convert said water cooled engine into an air cooled engine.

4. The combination with a water cooled internal combustion engine including a cylinder and supporting means therefor, of a complementary air cooling cylinder having an extension adapted to telescope with said first mentioned cylinder to aline it therewith, and means for securing said complementary cylinder to said water cooled engine cylinder.

5. The combination with a water cooled internal combustion engine including a cylinder and supporting means therefor, of a complementary air cooling cylinder having an extension adapted to be fitted within said first mentioned cylinder to aline it therewith, and means for securing said complementary cylinder to said water cooled engine cylinder whereby the engine will be adapted for air cooling, said securing means comprising a flange adapted to be seated upon the upper portion of said engine cylinder.

6. The combination with a water cooled internal combustion engine, including a cylinder and a supporting means therefor and a valve operating mechanism, of an air cooled cylinder adapted to be demountably mounted upon said first mentioned cylinder and having means for securing it thereto in axial alinement therewith, whereby said water cooled engine will be converted into an air cooled engine, intake and exhaust valves mounted in the upper portion of said air cylinder, and means for operatively connecting said valves with said valve operating mechanism.

7. A demountable air cooled cylinder having a plurality of heat radiating fins or webs thereon, a water cooled cylinder, means for securing said cylinders together, intake and exhaust valves mounted upon said air cooled cylinder, a valve operating mechanism and means adapted to operatively connect said valves and said valve operating mechanism.

8. An internal combustion engine comprising a crankshaft, a connecting rod, cylinder and piston, and an air-cooled cylinder telescopically engaging the engine cylinder, and adapted to increase the normal distance between said crankshaft and the combustion chamber of said cylinder thereby lessening the effective operating angle of said connecting rod and minimizing frictional contact between the walls of said piston and said combustion chamber.

9. A method of converting an engine having a water-cooled cylinder head into an air cooled engine which consists in removing the water cooled cylinder head, and providing an air cooled extension in lieu thereof having a combustion chamber and piston.

10. A method of converting an engine having a water-cooled cylinder head into an air cooled engine which consists in removing the water cooled cylinder head, and mounting in the cylinder an air cooled extension having a combustion chamber and piston.

In witness whereof, I have hereunto set my hand this 13th day of June 1925.

ALBERT B. J. SMITH.